US006198096B1

(12) United States Patent
Le Cocq

(10) Patent No.: US 6,198,096 B1
(45) Date of Patent: Mar. 6, 2001

(54) HIGH DUTY CYCLE PSEUDO-NOISE MODULATED TIME-OF-FLIGHT MASS SPECTROMETRY

(75) Inventor: Christian Le Cocq, Palo Alto, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/219,212

(22) Filed: Dec. 22, 1998

(51) Int. Cl.$^{7}$ .............................. B01D 59/44; H01J 49/00
(52) U.S. Cl. .............................................. 250/287; 250/282
(58) Field of Search ...................................... 250/282, 287

(56) References Cited

U.S. PATENT DOCUMENTS

| | | | | |
|---|---|---|---|---|
| 5,396,065 | | 3/1995 | Myerholtz et al. | 250/287 |
| 5,696,375 | * | 12/1997 | Koster | 250/287 |
| 5,744,797 | * | 4/1998 | Park | 250/287 |
| 5,821,534 | * | 10/1998 | Park | 250/287 |
| 5,861,623 | * | 1/1999 | Park | 250/287 |
| 6,011,259 | * | 1/2000 | Whitehouse et al. | 250/287 |

FOREIGN PATENT DOCUMENTS

WO 98/08244 2/1998 (WO) ............................. H01J/49/00

OTHER PUBLICATIONS

Solomon Golomb, "Shift Register Sequences; Secure and Limited–Access Code Generators Efficiency Code Generators Prescribed Property Generators Mathematical Models, 1982, *Aegean Park Press*".

* cited by examiner

Primary Examiner—Bruce C. Anderson

(57) ABSTRACT

A technique for analyzing ions by determining the time of flight of the ions from a source before detection at a detector. In the technique a series of pulses is generated according to an encoded sequence. Pulses from the series of pulses are selected to launch a plurality of packets of ions from the source, each of the selected pulses launching a packet of ions such that ions launched in the adjacent packets overlap prior to reaching the detector. At the end of the series another cycle of the series is generated again and some of the pulses in the series are selected in the another cycle to launch a plurality of packets of ions from the source. The cycles of pulse generation and selection to launch ions are repeated. The time of arrival of the ions of each packet in the detector is determined to obtain signals corresponding to overlapping spectra of the time of arrival of the packets of ions. The signals are correlated with the encoded sequence to derive a nonoverlapping spectrum from the overlapping spectra.

18 Claims, 5 Drawing Sheets

HIGH DUTY CYCLE PSEUDO-NOISE MODULATED TIME-OF-FLIGHT MASS SPECTROMETRY

FIELD OF THE INVENTION

The present invention relates to techniques for analyzing ions by time-of flight mass spectrometry, and more particularly to techniques for analyzing ions packets by mass spectrometry that result in overlapping spectra.

BACKGROUND

Mass spectrometry is a significant tool useful for analyzing ions. The knowledge of the masses and relative abundance of the various fragments produced after a ionized compound breaks down helps the investigator in determining the chemical structure of an unknown. If the compound has been analyzed with mass spectrometry, searching a mass spectral library may help to identify the compound.

In traditional mass spectrometry, the ions go through an electrostatic, magnetic or electromagnetic (quadrupole for instance) filter that only lets through ions of a given mass. The ions are then detected. The filter is tuned to a different mass and the experiment repeated until all the masses of interest have been measured. Sensitivity often is not as good as desired because except those ions of the mass allowed through the filter, all others are discarded at a given time.

In time of flight mass spectroscopy (TOF-MS), a packet of ions is launched by an electrostatic pulse towards a detector a distance away. Ions having the same initial kinetic energy but different masses will separate when allowed to drift along a field-free region. The ions have been given either equal momentum or equal energy, and they separate in flight according to their masses, heavy ions arriving behind light ions. By measuring the flight times, one can know the masses of the various ions in the packet. Because each packet contains only a few ions, the experiment is repeated many times and the measurements are summed in order to increase sensitivity. After a few hundred to a few thousand cycles, which may take only a fraction of a second, the quality of the measurement is sufficient to identify the compound. The ions of all masses are analyzed in parallel instead of one mass at a time.

The sensitivity problem with TOF-MS is due to the duty cycle effect. In cases where the MS is used to analyze the effluents of a chromatograph, for instance, the influx of analytes in the spectrometer is continuous. Because in a conventional TOF-MS after a packet of ions is pulsed the second packet cannot be pulsed until the ions in the first packet have all arrived at the detector, the analyte ions have to be stored or discarded between pulses. Storing is very hard to achieve practically for a large range of masses. In most implementations the ions are generated continuously and mostly discarded between pulses. If the ions are pulsed faster than the above limit, the heavy ions launched by one pulse arrive after the light ions launched by the next pulse. This results in having the heavy mass part of the mass spectrum being overlaid on top of the light mass part, resulting in data that are hard and ambiguous to interpret. Discarding analytes between pulses, of course, is not conducive to high sensitivity. If mass spectrometry is conducted without the overlap of heavy and light ions in the spectrum, there is a fundamental hardware limitation to the pulsing speed. The limitation is due to the time it takes to launch the ions, switch the potential of the various electrostatic plates, or simply gather enough ions in the launch area for a good measurement. Such a limit will be referred in hereinafter simply as hardware limit, or mass spectrometer hardware limit, which correspond to the maximum hardware pulsing speed of the spectrometer. Such a method is referred to as the "pulse and wait method."

Compared to the pulse and wait method in conventional mass spectrometry in which a second ion packet is not sent through the mass spectrometer until the previous ion packet has reached the detector, in Direct Pseudo-Noise TOF-MS described in U.S. Pat. No. 5,396,065 (issued on Mar.7, 1995 to Myerholtz et al., whose patent is incorporated by reference herein in its entirety) the ion launching pulses are repeated at a much faster speed, with about half the pulses omitted according to an established sequence. The resulting ion arrival times overlap as explained before, but because of the special properties of the pulsing sequence, a simple mathematical transformation can unscramble the result and reconstruct the spectrum that would have been produced with only one pulse per acquisition period. Such a sequence of pulses looks like a sequence of pulses at constant speed with half of them "randomly" suppressed. Because many of the pulses are now as close to one another as the hardware permits, in the method of U.S. Pat. No. 5,396,065 the experiment can be set to analyze about 50% of the ions produced, yielding a significant increase in sensitivity of the measurement. However, to obtain better results in analysis, there is still a need to increase the efficiency, to a level much more than the 50% efficiency achievable so far in prior technology.

SUMMARY

This invention provides techniques for analyzing ions by determining the time of flight of the ions from a source before detection at a detector. In this technique, a series of pulses according to an encoded sequence is generated and from the sequence is selected pulses to launch a plurality of packets of ions from the source. Each of the selected pulses launches a packet of ions such that ions launched in the adjacent packets overlap prior to reaching the detector. At the end of the series of pulses according to the encoded sequence, another cycle of the series is generated again and pulses are selected, preferably from those that have not be selected before, to launch a plurality of packets of ions from the source. The time of arrival of the ions of each packet in the detector is detected. Signals corresponding to the overlapping spectra of the time of arrival of the packets of ions are generated and correlated with the signals with the encoded sequence to derive a nonoverlapping spectrum from the overlapping spectra. Preferably, after an adequate number of repetition of such cycles all the pulses have been selected at least once and preferably they are selected in equal amounts.

The technique of the present can be advantageously used for significantly increasing the sensitivity of TOF-MS. By prudently selecting the pulses from the pseudo-irregular sequence so that all of the pulses in the sequence are selected after a number of cycles, there is no longer the need to discard about half of the sequence in an encoded sequence as in the prior pseudo-random overlapping spectra technique. With the present invention, close to 90% efficiency (i.e., the use of the sequence) can be achieved. The present technique is particularly useful when the maximum hardware pulsing speed is significantly larger than the inverse of the time of flight of the heaviest ions in the experiment.

BRIEF DESCRIPTION OF THE DRAWINGS

The following figures are included to better illustrate the embodiments of the apparatus and technique of the present invention. In these figures, like numerals represent like features in the several views.

DETAILED DESCRIPTION

In one aspect of the invention, the present invention provides a technique for analyzing ions by releasing packets of ions (ion packets) from a source (i.e., a sample being analyzed) according to selected pulses in an encoded sequence of pulses and repeating the sequence to select other pulses from the encoded sequence. Releasing ion packets according to this scheme, close to the maximum hardware pulsing speed in the release of ion packets can be used.

Figure 1:
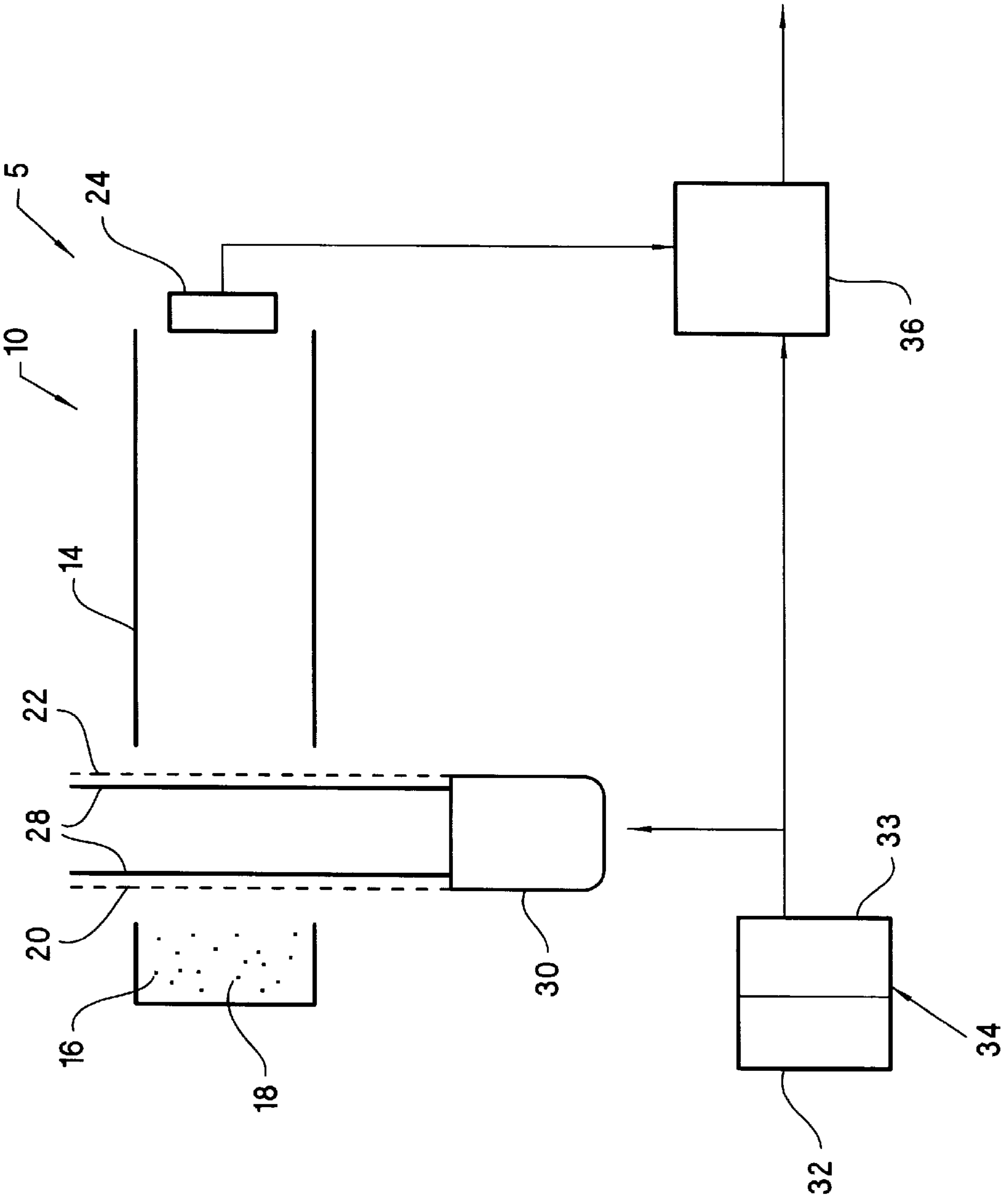
FIG. 1 shows a schematic view of an embodiment of an apparatus of the present invention.

FIG. 1 shows an illustrative embodiment of a time-of-flight apparatus 5 according to the present invention. The apparatus 5 includes a mass spectrometer 10, which includes a flight channel 14, in which ions can pass. An ion source 16 generates ions 18, which can be released from the ion source 16 by an extraction grid 20. In a case where ions are continuously generated from the ion source, the extraction grid 20 admits the ions as packets into the space between the two plates 28.

An entrance grid 22 is connected to an electrical potential (source of which is not shown) for controlling, i.e., permitting or preventing, the entrance of the ions into the flight channel 14. Plates 28, connected to power supply 30, cause bunching of the ions between the extraction grid 20 and entrance grid 22 before releasing as a packet of ions into the flight channel. The plates act as a capacitor to provide the ions at the trailing edge a greater propelling energy impulse than similar ions at the leading edge so that they reach the entrance grid 22 about simultaneously. Ions, once admitted into the flight channel, in the absence of an applied electrical or magnetic field, will drift towards the exit end of the flight channel 14 and be detected by a detector 24. The time of flight of the ions in the flight channel can be analyzed to provide information on the analytical characteristics, such as the charge-mass ratio of the ions. Such information will in turn provide information on the analytical characteristics, such as the chemical makeup, of the ion source, which can be a sample being analyzed.

Controller 34 sends control signals to the spectrometer 10, more particularly, to the extraction grid 20 to release a packet of ions at selected intervals in accordance to a coded sequence. The detector 24 in the mass spectrometer 10 directs signals (detection signals) corresponding to the ions detected to a processor 36, which calculates the correlation between the detection signals and the signals from the controller. Based on the correlation results, the processor 36 provides information on the analytical characteristics of the ion source 16. The encoded sequence used by the controller 34 to control the release of ion packets into the flight channel is established by generating a pseudo-irregular sequence of pulses and selecting from that sequence according to a particular scheme. A clock 32 generates the clock ticks that is divided down by a sequence generator 33. The sequence generator selects from the divided down clock ticks to generate a pseudo-irregular sequence and select from the pseudo-irregular sequence to result in signals to control the extraction grid.

To better understand the present invention, the use of pseudo-irregular sequence in mass spectrometry similar to the Myerholtz et al. approach (supra) is briefly described in the following.

Direct Modulation in TOF-MS

In this prior technique, an instrument similar to that shown in FIG. 1 is used, except that the ion packets are released by an encoder according to a pseudo-irregular sequence (e.g., pseudo-random noise sequence) and a correlator correlates the signals from the detection of ions to the signals of the pseudo-random sequence. In this technique, packets of ions are released from the source into the mass spectrometer. A relatively short (compared to conventional pulse and wait method) period of time intervenes between two temporally adjacent packets (say a first packet and a second packet). After passing though the containment 20 (similar to the flight channel of the present invention), the ions of the two packets overlap. Thus, when the signals from the detector is analyzed, the spectra of individual packets detected show signals that are an accumulation of the overlapping spectra from the various ion packets from the propagation path of the mass spectrometer. The correlator, relying on the pseudo-random noise code used in launching the ions with the detector signals, establishes a nonoverlapping spectrum corresponding to an ion packet. Thus, the nonoverlapping spectrum with respect to the time of flight of the ions in an ion packet is obtained.

Figure 2:
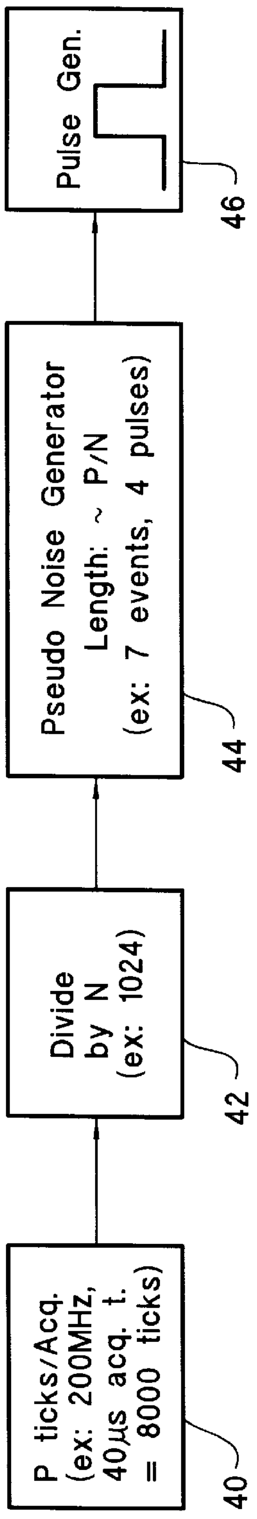
FIG. 2 shows a flow chart for the generation of pulses for the Direct Modulation method.

The generation of pulses for releasing ion packets is illustrated in the following, in which pseudo-random noise sequence is used for the pseudo-irregular sequence. This example is shown in FIG. 2. For instance, assume that the acquisition period by a detector in the mass spectrometer needs to be about 40 $\mu$s, with a minimum pulse spacing at least 5.12 $\mu$s wide on a system where the acquisition clock is 200 MHz, there is one clock tick every: $1/200$ MHz=5 ns.

The number of clock ticks in the acquisition period, P, is (block 40 in FIG. 2) 200M ticks/sec×40$\mu$s=8,000 ticks.

Then within the duration of the pulse spacing the number of clock ticks, N, is 200M ticks/sec×5.12 $\mu$s=1024. Thus, the base event of the modulation sequence has to be 1024 clock ticks wide (see block 42 in FIG. 2).

To generate the number of events during the acquisition period, the input of the sequence generator, which generates the pseudo-random sequence, is the acquisition length in clock ticks divided by 1024, i.e., number of events within the acquisition period is P/N=8,000/1024=7 (see block 3 in FIG. 2).

Figure 3:
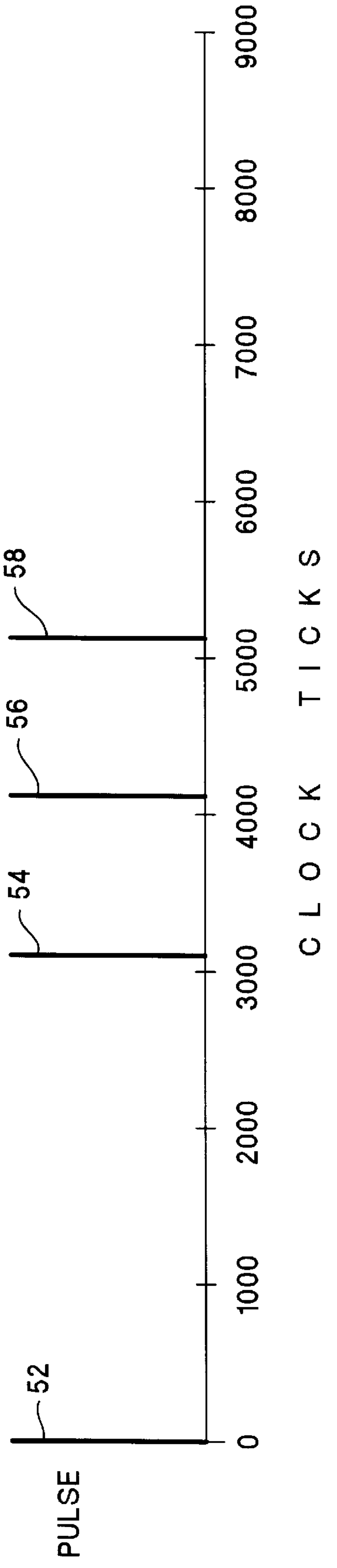
FIG. 3 shows the pulses for driving the release of packets of ions (or ion packets) in the Direct Modulation method.

Thus one needs to find a sequence the length of which is about 40$\mu$s. By using a sequence of length having 7 events, the length will be 7×1024×5 ns, or 35.84 $\mu$s. Using the pseudo-random sequence, this sequence outputs 4 pulses in 7 minimum pulse spacings (see block 46 in FIG. 2). Thus, four pulses are generated in the acquisition period to release ion packets into the mass spectrometer for time-of-flight analysis. Therefore, the resulting overall efficiency is 57.1%. FIG. 3 illustrates an example of a pseudo-random sequence of such pulses in relation to the clock ticks. There are four pulses 52, 54, 56, 58 during the acquisition duration of 8,000 ticks.

Sparse Fast Modulation

In the present invention, Sparse Fast Modulation (SFM), the rate of the pulses is increased to almost the maximum speed possible for the mass spectrometer hardware instead of using an average speed about 50% of the maximum speed as in the Direct Pseudo-Noise technique described in the above. The result is almost doubling the effective number of pulses in a given time, achieving a corresponding gain in sensitivity. Typically, one can achieve an average speed around 90% of the maximum hardware pulsing speed or better and still recover the data to arrive a spectrum that is without any overlap of light/heavy ions signals. This technique is called “Sparse Fast Modulation” (SFM) because a fast pseudo-irregular sequence is used and pulses from this fast pseudo-irregular sequence are selected to result in a modulation for releasing ion packets.

Sparse Fast Modulation is an extension of Direct Modulation technique. The systems for the two are similar except that the pseudo-irregular sequence (e.g., pseudo-random noise sequence) used in the present invention is much faster and proportionally longer than in the direction Modulation technique. To make the sequence compatible with the mass spectrometer hardware, the pseudo-irregular sequence output is selected with a consistent method (e.g.,divided by a large number) to generate pulses to release ion packets to the mass spectrometer. Preferably, after repeating the pseudo-irregular sequence to generate pulses the appropriate number of times, all the pulses of the fast sequence would have been used at least once and preferably all the pulses have been selected in equal amounts. In a preferred embodiment, after repeating a number of cycles, all the pulses have been selected once. The result of the summation of the signals generated at the detector on ions impinging thereon is the same (noise considerations apart) as if the mass spectrometer hardware had been able to output the fast sequence at full speed. In other words, a faster pseudo-irregular sequence is generated first, but because the sequence is too fast, only a subset of the pulses of the pseudo-irregular sequence is output to the mass spectrometer during each acquisition period. After cycling through all the possible subsets, the data that would have arisen from the fast sequence is constructed. In effect, the present technique spreads out the fast sequence to a speed compatible with the mass spectrometer hardware through repeating the sequence and selecting different pulses from the sequence in the different episodes of repetition.

The pseudo-irregular sequence is selected to enable the spectra of ion packets to overlap in a way that can be analyzed to extract the individual spectra using mathematical techniques. Pseudo-irregular sequence with well-known properties are known in the art. A preferred pseudo-irregular sequence is the pseudo-random sequence, which can be analyzed by known deconvolution techniques. Such pseudo-random codes are also referred to as “pseudo-noise” code herein. Techniques for generating pseudo-random codes are well known in the art. It is also to be understood that one skilled in the art of pseudo-irregular sequences, based on the present disclosure, will be able to identify suitable pseudo-irregular coded sequences, such as sequences accorded to the Golay codes. However, for clarity of illustration, the illustrative example of pseudo-random sequence will be discussed in more detail than the others. A person skilled in the art will be able to infer the application of other pseudo-irregular codes.

Choice of Modulation Parameters in SFM

Figure 4:
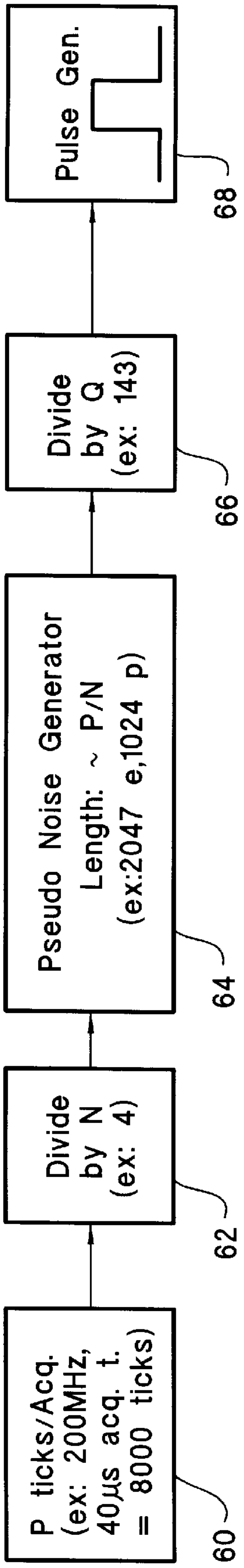
FIG. 4 shows a flow chart for the generation of pulses for the Sparse Fast Modulation method of the present invention.

As an illustration to the method, FIG. 4 is a flow-diagram showing the steps of generating the pulses that release ion packets to the mass spectrometer. The length of the modulating sequence has to be at least as long as the window of time of interest, i.e., as long as the longest time of flight in most cases. This condition fixes the product of the sequence length to the acquisition clock divider. The multiplication product of the sequence length and the acquisition clock divider equals the acquisition time. Assuming the clock of 200 MHZ is used and an acquisition period of 40 $\mu$s is used, there are 8,000 (P) clock ticks during the acquisition period (block 60 in FIG. 4). Assuming the pseudo-noise generator can generate the sequence at a rate of 50 MHz, because the sequence can now be as fast as possible regardless of the mass spectrometer speed, one only needs to divide the incoming 200 MHZ from the clock by 4 (N) to drive the pseudo-noise sequence generator hardware at 50 MHZ. N is the factor for dividing down the clock rate to achieve the desired pseudo-noise generator rate (block 62).

In order to have an acquisition time around 40 $\mu$s one would need to use a sequence that is P/N (i.e., 2047) events long. Since the pseudo-random sequence is used in this illustrative example, the number of pulses is 1024 pulses (block 64). Since the length of a clock tick is 1 second/200 MHz, i.e., 5 ns, the acquisition time in the acquisition period will be 2047×4×5 ns, i.e., 40.94 $\mu$s. The minimum spacing between adjacent pulses for driving the release of ion packets in the mass spectrometer has to be set at about at least as large as the mass spectrometer hardware minimum pulse spacing. This condition roughly fixes the ratio of the pseudo-random sequence length to the sequence output divider that drives the release of ion packet. The pseudo-random sequence is run repeatedly in cycles to drive the mass spectrometer to release ion packets.

For every Qth pulse in the pseudo-random sequence a pulse is generated to release a packet of ions into the mass spectrometer (block 66). Q is selected such that it cannot divide 1024 without leaving a remainder. In this way, the same pulses in the pseudo-random sequence are not selected for the different repeating cycles of the pseudorandom sequence before all the pulses have been selected once. To find the actual divider matching exactly the requirement that the closest spacing between two adjacent pulses be exactly the mass spectrometer hardware minimum, one needs to determine the factor Q that divides down the pseudo-random sequence. In an example of a desired mass spectrometer pulse spacing of 5.12 $\mu$s, the minimum number of pseudo-random sequence pulses per actual mass spectrometer driver pulse is 5.12 $\mu$s×1024/40 $\mu$s, i.e., 128 pseudo-random pulses. Q can be found by finding a number that is equal to or bigger than 128 that cannot divide 1024 without remainder and where the minimum ticks between adjacent mass spectrometer driver pulses is equal or bigger than 1024. That is, no two pulses are closer than 1024 clock ticks. Q can readily be determined by trial and error starting from 128. Such trial and error technique can easily be done with a computer. In this illustrative example, the first such a number is 143. Therefore the value of Q is determined to be 143. Thus, the pulses from the pseudo-random sequence (from the pseudo-noise generator) is divided by Q to derive the pulses to drive the release of ion packets (block 68). It is to be understood that one skilled in the art, based on the present disclosure, will be able to derive other methods for selecting from the pseudo-irregular sequence used to select the items in the sequence only once prior to reselecting an item, if ever.

Figure 8:
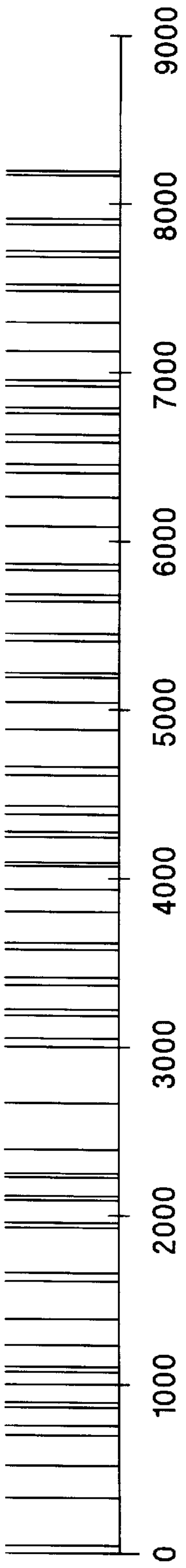
FIG. 8 shows an example of the overlay of the timing of pulses for releasing ion packets at the mass spectrometer during 10 cycles of the pseudo-irregular sequence.
Figure 5:
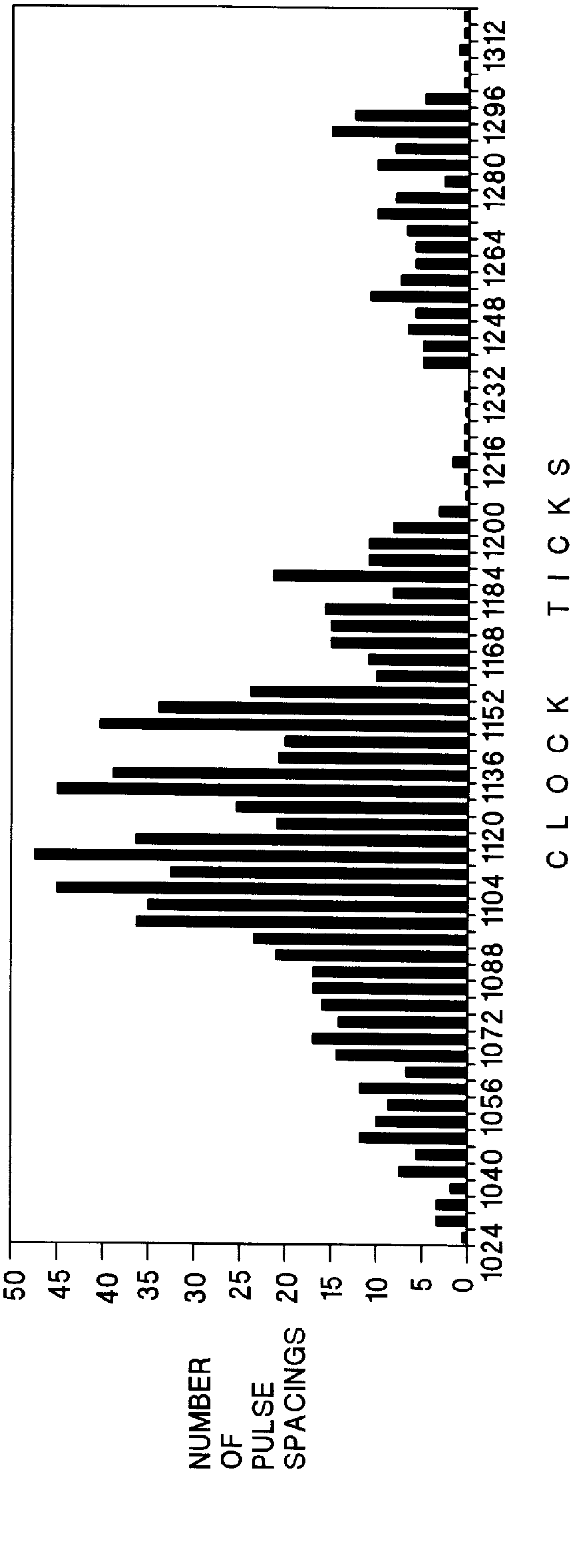
FIG. 5 shows a histogram showing the distribution of pulse spacings in an embodiment of present invention.
Figure 6:
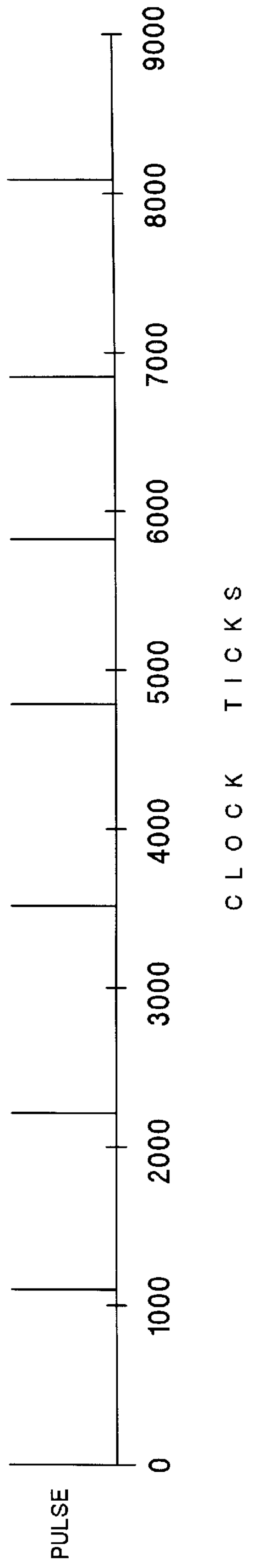
FIG. 6 shows an example of the timing of pulses for releasing ion packets at the mass spectrometer during a cycle of the pseudo-irregular sequence.
Figure 7:
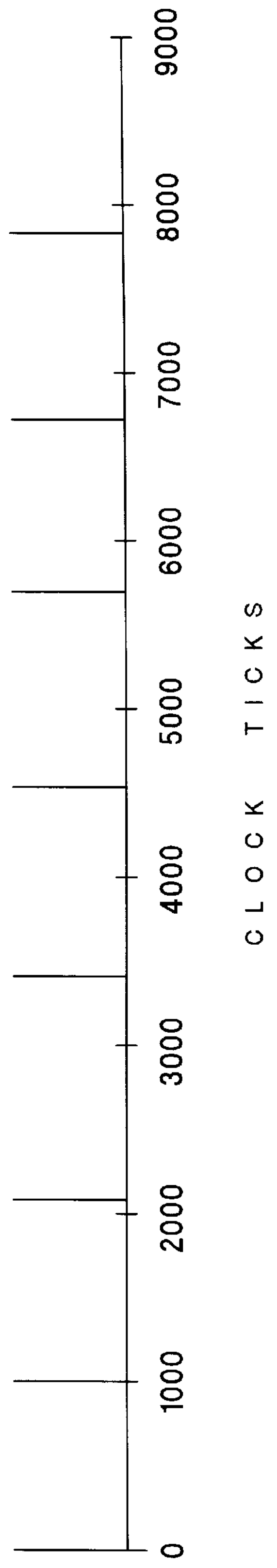
FIG. 7 shows an example of the timing of pulses for releasing ion packets at the mass spectrometer during another cycle of the pseudo-irregular sequence.

For that divider with a Q of 143, the average spacing is 1140 clock ticks and the maximum spacing is 1320 clock ticks. The distribution of pulse spacings is shown on the histogram in FIG. 5. FIG. 6 shows an example of the pulses for driving the release of ion packets derived from a cycle of repetition of the pseudo-random sequence. FIG. 7 shows an example of the pulses for driving the release of ion packets derived from a cycle of repetition of the pseudo-random sequence subsequent to the cycle of FIG. 6. FIG. 8 shows an example of the overlay of the pulses for driving the release of ion packets derived from 10 consecutive cycles of the pseudo-random sequence.

Assuming that any spacing larger than 1024 results in a loss in sensitivity by the amount in excess, it can be shown that an optimum sequence of 1024 pulses would have taken 1024×1024 clock ticks. Using the above illustrative pseudo-random sequence takes 143×2047×4 clock ticks. The ratio of those numbers shows that the average speed of this sequence is 89.6% of the maximum hardware speed, which is substantially higher than the about 50% of the Direct-Pseudo-Noise prior technique.

It is found that the pseudo-noise sequences used to encode the pulse train of the TOF-MS experiment according to the present invention have excellent short term random behavior. The interval between two pulses which are Q pulses apart where Q is large relative to the register length used to generate the sequence is almost constant. Therefore, if one uses a pseudo-noise sequence with its output divided by Q, one will obtain a pulse train where the pulses are almost equally spaced in time. Preferably, the pulses in the sequence are selected that no two adjacent selected pulses in the sequence are wider apart than 110% of the narrowest separation between adjacent selected pulses. If the proper underlying sequence and divisor are used, one can make the resulting pulse frequency derived from the pseudo-noise sequence close to the maximum frequency bearable by the mass spectrometer run, therefore achieving close to 100% duty cycle. As each acquisition period only sees a Qth of the underlying sequence, the experiment has to be repeated Q times and summed over to reconstitute the data corresponding to the fast sequence. Q has to be prime with the number of pulses of the fast sequence so that all the pulses in the underlying sequence will be output the same number of times. In maximum length pseudo random sequences, the number of pulses is always a power of two, so any odd number is a good divider. The drawback in SFM is that the underlying fast sequence is now using a clock Q times faster than the maximum clock used before, and that this timing accuracy has to be carried out throughout all the data system and the hardware for the experiment to be ultimately decoded by the correlation. This turns out not to be a substantial problem because the maximum clock rate achievable in digital hardware is much faster than the TOF-MS experiment pulsing requirements. Furthermore, the equipment has to be able to digitize the result of the TOF-MS experiment at speeds that are much greater than the TOF-MS pulse speed limits to be able to analyze the results anyway, so the new timing requirements are a modest addition to the instrument design specifications. As shown above, the spacing between adjacent pulses in SFM is almost constant. This means that the pulse sequence looks like a constant speed sequence with some time jitter on the position of the pulses. This jitter is what now carries the "randomness" of the sequence, as opposed to missing pulses (i.e. large gaps between pulses) in the case of the Direct Modulation.

Signal to Noise Estimations

In the following analysis, "noise" will be defined as the measurement noise, the difference between the signal measured with infinitely faithful and linear electronics and the actual measurement data. In particular, an undesirable signal which is truly a product of the physical experiment, but not the intended result (low level contamination, stray ions, unstable ions exhibiting secondary fragmentation, etc.) is not considered noise for that purpose. In practice, however, the user wants to improve the readability of the meaningful signal, and therefore may feel that the meaningful signal to useless noise ratio is much more improved by the modulation than what the following computations predict (a case of signal present for a very short time, for instance). Noise is uncorrelated with the signal, and with itself.

In running standard experiments by time-of-flight mass spectrometry using the conventional pulse and wait technique, after having repeated the experiment r times, the signal S and the noise E relationship, where s is the signal for each experiment and n is the noise for each experiment, will be:

$$S=r\cdot s \qquad \text{Eq.(1)}$$

$$E=(r)^{0.5}\cdot n \qquad \text{Eq.(2)}$$

$$S/E=(r)^{0.5}\cdot s/n \qquad \text{Eq.(3)}$$

In the correlation with the modulation sequence, the signal comes from the sum of the signal containing data points minus the sum of the "empty" data points. The noise comes from all these data points.

In the Direct Modulation method, with a sequence of M pulses and M−1 event slots where pulses are absent, there are a total of r repetitions. In the following, it is assumed that M is large enough that 2M is about equal to 2M−1. The noise and signal relationship will be:

$$S=r\cdot M\cdot s \qquad \text{Eq. (4)}$$

$$E=\{r\cdot(2M-1)\}^{0.5}\cdot n \qquad \text{Eq. (5)}$$

$$S/E\approx\frac{(r\cdot M)^{0.5}}{(2)^{0.5}}\cdot s/n \qquad \text{Eq. (6)}$$

In the Sparse Fast Modulation method, with a sequence of M pulses divided by Q, the number of repetitions is r Q. The noise and signal relations is:

$$S=r\cdot M\cdot s \qquad \text{Eq. (7)}$$

$$E=\{r\cdot Q\cdot(2M-1)\}^{0.5}\cdot n \qquad \text{Eq. (8)}$$

$$S/E\approx\frac{(r\cdot M)^{0.5}}{(2\cdot Q)^{0.5}}\cdot s/n \qquad \text{Eq. (9)}$$

To compare the three methods, assume that the total acquisition time, T, is the same, and that the maximum number of pulses per individual acquisition time, p, is the only limit to modulation speed. The signal to noise ratios are:

For standard method:

$$S/E\ (T)^{0.5} \qquad \text{Eq. (10)}$$

For the Direct Pseudo-noise Modulation method:

$$S/E\ (rM/2)^{0.5} \qquad \text{Eq. (11)}$$

For the Sparse Fast Modulation method:

$$S/E\ (T \cdot p)^{0.5} \qquad \text{Eq. (12)}$$

Therefore, it is clearly shown that the present invention results in significantly better signal to noise ratio than prior techniques.

Although the preferred embodiment of the present invention has been described and illustrated in detail, it is to be understood that a person skilled in the art can make modifications, especially in size and shapes of features within the scope of the invention.

What is claimed is:

1. A method for analyzing ions by determining the time of flight of the ions from a source before detection at a detector, comprising:

(a) generating a series of pulses according to an encoded sequence;

(b) selecting from the series of pulses to launch a plurality of packets of ions from the source, each of said selected pulses launching a packet of ions such that ions launched in the adjacent packets overlap prior to reaching the detector;

(c) at the end of the series generating again another cycle of the series and selecting in the another cycle a number of pulses that have not be selected before in the series to launch a plurality of packets of ions from the source;

(d) detecting the time of arrival of the ions of each packet in the detector and obtaining a signal corresponding to the overlapping spectra of the time of arrival of the packets of ions; and (e) correlating the signal with the encoded sequence to derive a nonoverlapping spectrum from the overlapping spectra.

2. The method according to claim 1 further comprising repeating cycles of the series and selecting pulses from the series to launch a plurality of packets of ions such that all of the pulses in the sequence have been selected at least once.

3. The method according to claim 2 wherein all the pulses in the sequence have been selected in equal amount and at least once.

4. The method according to claim 1 further comprising repeating cycles of the encoded sequence and selecting the pulses from the cycles of the series such that substantially all the pulses of the series have been selected once and only once before any pulse in the series of encoded sequence is selected again.

5. The method according to claim 1 further comprising selecting from the series of encoded sequence one pulse per a predetermined number of pulses sequentially along the sequence.

6. The method according to claim 5 further comprising determining the predetermined number of pulses such that the number of the pulses in the series of encoded sequence is not divisible by that predetermined number.

7. The method according to claim 6 further comprising determining the predetermined number of pulses such that no separation between two adjacent selected pulses in the series of encoded sequence is temporally narrower than the narrowest temporal separation between two adjacent pulses that can be generated by a pulse generator generating the series of encoded sequence.

8. The method according to claim 1 further comprising generating a pseudo-irregular sequence as the encoded sequence.

9. The method according to claim 1 further comprising generating a pseudo-random noise sequence as the pseudo-irregular sequence.

10. The method according to claim 1 further comprising generating a series of temporally regular pulses at a rate faster than the encoded sequence and selecting from the temporally regular pulses to result in pulses according the encoded sequence.

11. A method for analyzing ions by determining the time of flight of the ions from a source before detection at a detector, comprising:

(a) generating a series of pulses according to a pseudo-irregular sequence;

(b) selecting from the series of pulses to launch a plurality of packets of ions from the source, each of said selected pulses launching a packet of ions such that ions launched in the adjacent packets overlap prior to reaching the detector;

(c) at the end of the series generating again another cycle of the series and selecting a number of pulses that have not be selected before in the series in the another cycle to launch a plurality of packets of ions from the source, and repeating the series in cycles until all the pulses in the sequence have been selected once, wherein no two adjacent selected pulses in the sequence are wider apart than 110% of the narrowest separation between adjacent selected pulses;

(d) detecting the time of arrival of the ions of each packet in the detector and obtaining a signal corresponding to the overlapping spectra of the time of arrival of the packets of ions; and (e) correlating the signal with the encoded sequence to derive a nonoverlapping spectrum corresponding to ions in a packet of ions from the overlapping spectra.

12. The method according to claim 11 further comprising generating a series of temporally regular pulses at a rate faster than the pseudo-irregular sequence and selected from the temporally regular pulses to trigger the generation of the pseudo-irregular sequence.

13. An apparatus for analyzing a sample by time of flight mass spectrometry, comprising:

(a) signal generator for generating signals corresponding to a pseudo-random noise sequence of pulses;

(b) mass spectrometer for launching packets of ions from the sample, the time of arrival of the ions of each packet in a detector at a distance from the sample can be determined to determine the time of flight of the ions, the time of flight of an ion indicating its analytical characteristics;

(c) controller for receiving the signals corresponding to a pseudo-random noise sequence and selecting from the sequence of pulses to activate the mass spectrometer to launch a plurality of packets of ions from the sample, each of said selected pulses launching a packet of ions such that ions launched in the adjacent packets overlap prior to reaching the detector, at the end of the sequence the controller activating the mass spectrometer through another cycle of the sequence and selecting a number of pulses that have not be selected before in the sequence in the another cycle to launch a plurality of packets of ions from the source, such that signals corresponding to the overlapping spectra of the time of arrival of the packets of ions can be obtained; and (d) processor for deriving a nonoverlapping spectrum from the overlapping spectra to determine the analytical characteristics of the sample.

14. The apparatus according to claim 13 where the signal generator is a pseudo-random noise generator.

15. The apparatus according to claim 13 wherein the controller repeats cycles of the encoded sequence and selects the pulses from the cycles of the encoded sequence such that substantially all the pulses of the encoded sequence have been selected once and only once before any pulse in the encoded sequence is selected again.

16. The apparatus according to claim 13 wherein the controller selects from the series of encoded sequence one pulse per a predetermined number of pulses sequentially along the sequence.

17. The apparatus according to claim 13 wherein the controller determines the predetermined number of pulses such that the number of the pulses in the series of encoded sequence is not divisible by that predetermined number.

18. The apparatus according to claim 17 wherein the controller determines the predetermined number of pulses such that no two adjacent selected pulses in the series of encoded sequence are separated temporally narrower than the narrowest temporal separation that can be effected between two adjacent pulses generated by the signal generator generating the encoded sequence.

* * * * *